(12) United States Patent
Wong

(10) Patent No.: US 7,958,346 B2
(45) Date of Patent: Jun. 7, 2011

(54) MULTILAYERED SECURITY FOR SYSTEMS INTERACTING WITH CONFIGURATION ITEMS

(75) Inventor: Daniel ManHung Wong, Sacramento, CA (US)

(73) Assignee: Oracle International Corp., Redwood Shores, CA (US)

( * ) Notice: Subject to any disclaimer, the term of this patent is extended or adjusted under 35 U.S.C. 154(b) by 1676 days.

(21) Appl. No.: 11/206,701

(22) Filed: Aug. 18, 2005

(65) Prior Publication Data

US 2007/0043942 A1  Feb. 22, 2007

(51) Int. Cl.
*H04L 29/06* (2006.01)
(52) U.S. Cl. ............ 713/151; 713/187; 714/14; 714/42; 714/763; 714/807; 711/114
(58) Field of Classification Search .................. 713/187, 713/191, 1, 2, 100, 155–159, 166, 150, 201, 713/176, 180, 182, 194, 151; 707/1, 203; 717/168–178; 726/22–25, 3–4; 380/277–286, 380/259–266, 255, 251, 287; 709/223, 220, 709/217, 203
See application file for complete search history.

(56) References Cited

U.S. PATENT DOCUMENTS

| | | | |
|---|---|---|---|
| 6,292,569 B1 * | 9/2001 | Shear et al. | 380/255 |
| 6,643,694 B1 * | 11/2003 | Chernin | 709/223 |
| 6,694,434 B1 | 2/2004 | McGee et al. | |
| 6,715,075 B1 | 3/2004 | Loukianov | |
| 6,782,474 B1 * | 8/2004 | Ylonen | 713/162 |
| 7,069,437 B2 * | 6/2006 | Williams | 713/166 |
| 2003/0115461 A1 | 6/2003 | O'Neill | |
| 2003/0167407 A1 | 9/2003 | Howard | |

* cited by examiner

*Primary Examiner* — Taghi T Arani
*Assistant Examiner* — Narciso Victoria
(74) *Attorney, Agent, or Firm* — Kraguljac & Kalnay, LLC

(57) ABSTRACT

Systems, methodologies, and other embodiments associated with providing multi-layered security for configuration items are described. One exemplary system may include a security logic configured to process the contents of a configuration item based on the source of the configuration item and the integrity of the configuration item. The exemplary system may also include a verification logic configured to further process the contents and to selectively provide the contents. A configuration item may be provided to the security logic by a configuration item provider known to the security logic and related to the security logic by a first set of keys. The security logic may be related to the verification logic by a second set of keys different from the first set of keys.

29 Claims, 6 Drawing Sheets

MULTILAYERED SECURITY FOR SYSTEMS INTERACTING WITH CONFIGURATION ITEMS

BACKGROUND

Computing systems including hardware systems, software systems, and combinations thereof may interact with configuration items including bootstrap configuration files. These configuration items may provide information including desired security levels, values for configuration parameters, and so on. Typically these items are files that may be edited by anyone with an editor and write access. Thus, these files have become favorite targets for unscrupulous individuals like hackers and discontented system administrators. Thus, various approaches to protecting systems that interact with these files have been undertaken.

The conventional approaches include only accepting digitally signed configuration files, only accepting configuration files from certain providers, periodically taking snapshots of configuration files to determine whether they have been changed, and so on. However, these conventional approaches are either reactive, expose the computing system to the providers and thus place the burden of examining the configuration files on the computing system, and/or provide only a single level of security.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some cases one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
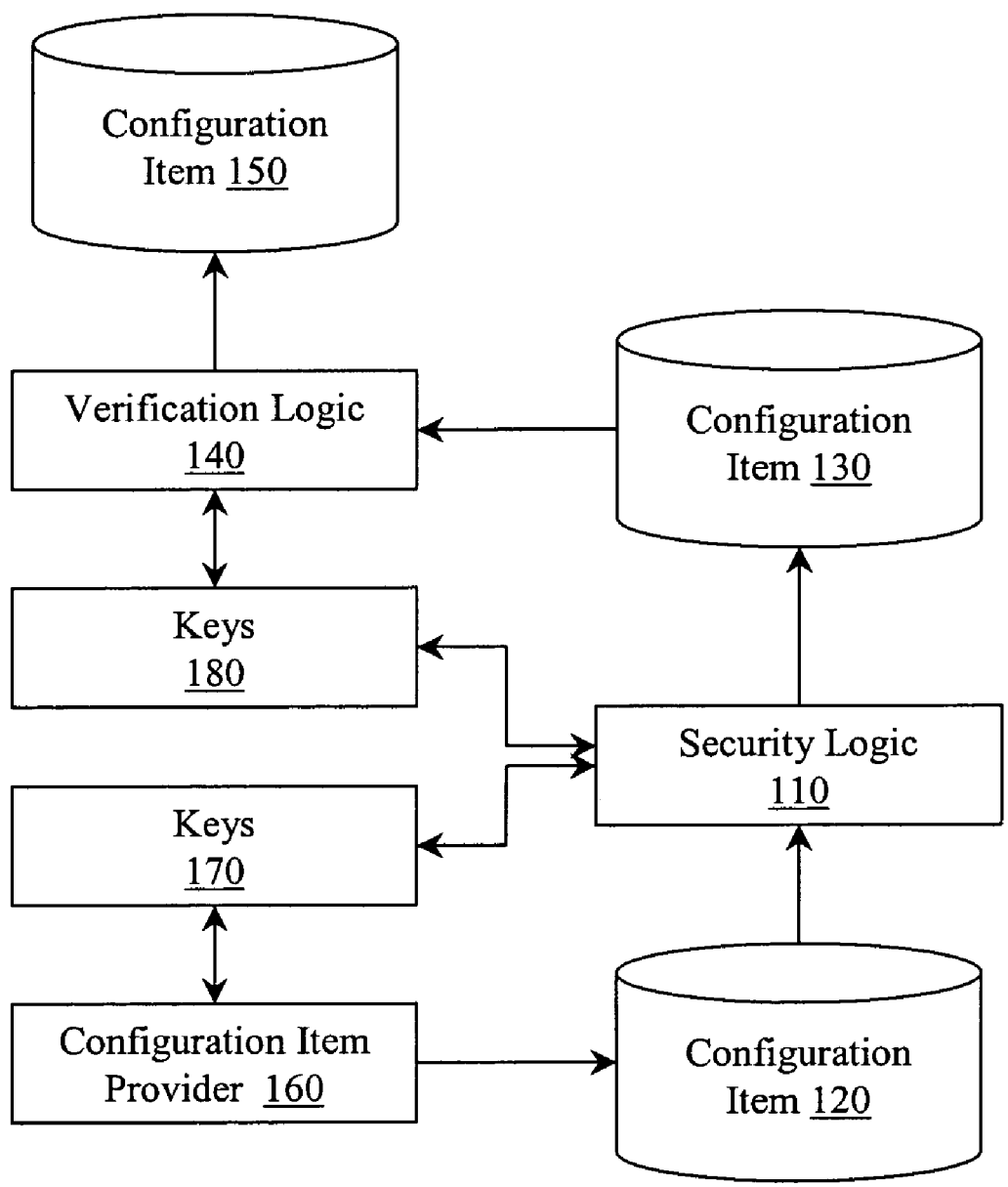
FIG. 1 illustrates an example system for providing multilayer security for systems that interact with configuration items (e.g., configuration files, configuration objects, configuration records).

Example systems, methods, media, and other embodiments described herein relate to providing multilayered security for systems that interact with configuration items including, for example, bootstrap configuration files, configuration files, configuration objects, configuration records, and so on. In one example, systems and methods facilitate logically isolating a protected system (e.g., database system) from configuration item providers that may include automated providers like programmed configuration file generators. In one example, a configuration item may be handled by two protection logics, each of which employs asymmetric keys to evaluate source identity and/or content integrity for a configuration item. At least one set of these asymmetric keys will be shielded from suppliers of configuration items, providing an additional layer of security over conventional systems. In another example, just-in-time checking of configuration files is provided. The example systems and methods may be employed to just-in-time check self-configured items and/or externally provided items.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Asymmetric keys" are employed in asymmetric key cryptography, asymmetric key digital signature processing, and so on. When using asymmetric keys, key material is bound to a single user. The key material is separated into two components, a private key and a public key. Each key is distinct from the other, thus there is no "shared secret" like in symmetric cryptography. Each key may be associated with a text handling function, a digital signature function, and so on. For example, a private key may be associated with a first function and a public key may be associated with a second function, where the functions are inversely related. Thus, if one of the functions is configured to encrypt a message, the other function is configured to decrypt the message. Or, if one function is configured to generate a digital signature, the other function is configured to analyze/verify the digital signature.

A "digital signature" refers to a string of bits computed from data being "signed" where the computing depends, a least in part, on a key (e.g., cryptographic key, asymmetric key) associated with the party signing the data. A digital signature facilitates verifying that signed data has not been modified since it was signed. A digital signature also facilitates verifying that signed data was signed by a party who purports to have signed the data. "Digitally signed" refers to data to which a digital signature has been added. A digital signature may be, for example, a cryptographic checksum computed as a function of a message and a private key.

"Decryption" refers to processing cyphertext (e.g., encrypted data) into cleartext (e.g., unencrypted data) using a cryptographic key (e.g., private key).

"Encryption" refers to processing cleartext (e.g., unencrypted data) into cyphertext (e.g., encrypted data) using a cryptographic key (e.g., public key).

A "message digest algorithm", also known as a "one way hash function", refers to processing an arbitrary sized input data referred to as a message into a fixed size output data referred to as a digest or a hash. A digital signature algorithm may compute a hash for a message and then digitally sign the hash instead of the message to save computational resources.

A "public key" is a known value (e.g., integer, string of bits) employed by an entity for interacting with another entity that protects data using a related private key. The protection may take the form of encryption, hashing, digitally signing, and so on. A public key is associated with a single private key. A public key may be embedded into a digital certificate with additional information that describes the owner of the public key (e.g., name, email address). When a digital certificate is generated, both a private key and its related public key are generated.

A "private key" is a known value (e.g., integer, string of bits) employed by an entity for interacting with another entity to whom a related public key has been provided. A private key may be used, for example, to generate digital signatures. A private key is typically held in secret and is associated with a single public key. Data encrypted using a public key can only be decrypted with its paired private key and vice versa.

"Public key encryption" refers to using a public key when producing a cyphertext that requires the corresponding private key to decrypt.

"Public key digital signature" refers to allowing parties with a public key to verify that a message signed with a digital signature was signed by the holder of a specific private key and that the signed message has not been changed since it was signed.

"Computer-readable medium", as used herein, refers to a medium that participates in directly or indirectly providing signals, instructions and/or data. A computer-readable medium may take forms, including, but not limited to, non-volatile media and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a hard disk, a magnetic tape, other magnetic medium, a CD-ROM, other optical medium, a RAM (random access memory), a ROM (read only memory), an EPROM, a FLASH-EPROM, or other memory chip or card, a memory stick, and other media from which a computer, a processor or other electronic device can read.

"Logic", as used herein, includes but is not limited to hardware, firmware, software in execution on a processor and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, on the environment in which it runs, and/or on the desires of a designer/programmer or the like. It will also be appreciated that in different examples computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein may be produced using programming languages and tools including Java, Pascal, C#, C++, C, CGI, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

FIG. 1 illustrates a system 100 that is configured to provide multilayer security for systems that interact with configuration items. Systems that may be protected include, for example, database systems, database management systems, computing systems, and so on. System 100 may include a security logic 110 that is configured to selectively process a configuration item 120. Configuration item 120 may be, for example, a file, an object, a record, and so on. In different examples, these configuration items may be generated by a computing system rather than by a human user. Configuration item 120 may hold data and/or instructions concerning how a system should operate, should be initialized, and so on. Configuration item 120 may include a first content. This content may be, for example, data describing settings for various configuration parameters. The configuration parameters may concern, for example, security, data repository location, optimization, memory allocation, server turning, and so on. The first content may be arranged in a first manner (e.g., key/value pairs, tab delimited fields) and may have a first format (e.g., cleartext). These requirements for a configuration item may be published, for example, as part of an application programming interface. Thus, a supplier of a configuration item may know the format for initially supplying a configuration item but may be shielded from knowing the ultimate arrangement, format, and so on of a configuration item that will be read by a computing system.

Security logic 110 may operate as a "choke point" in system 100, providing a guarded passageway through which configuration items pass before reaching a system like a database system. Since configuration items pass through this choke point, security logic 110 also provides an opportunity to produce an audit trail concerning changes proposed to a system through configuration files. The amount of intelligence present in security logic 110 may also facilitate having the logic act as a "trusted security officer" who is able to participate in change control for a system(s) receiving configuration item 120.

Security logic 110 may process the content and/or format of configuration item 120 to produce a configuration item 130 having a second content and/or second format. This second content and/or second format may be hidden from suppliers of configuration items, even automated configuration file generators, thereby providing an extra layer of security for systems interacting with configuration items. While two separate configuration items (e.g., 120, 130) are illustrated, it is to be appreciated that in some examples item 120 may be manipulated and logically become item 130 while physically remaining item 120. For example, when a configuration file is involved, the file may be opened, read, manipulated, and written by security logic 110. While the configuration file may have a different content and/or format, it may still be the same file though logically it is now item 130 instead of item 120. By way of illustration, data concerning a security level to be employed by a database system may initially be formatted as a record and then be processed into a key/value pair. Similarly, data concerning a type and/or level of optimization to be employed by a database system may initially be formatted as a tab-delimited list and then be processed into a key/value pair.

Whether and/or how item 120 is processed into item 130 may depend, at least in part, on analyzing and verifying the source of item 120 and the digital integrity of item 120. For example, security logic 110 may analyze whether item 120 was received from a provider 160 that is known by security logic 110 and that is trusted by security logic 110. The identity may be verified using, for example, a public key digital signature. Similarly, the digital integrity of item 120 may be verified using, for example, private key cryptography. Verifying the digital integrity may include determining whether the first content has been changed since item 120 was provided and signed by provider 160. While public key digital signature and private key cryptography are described, it is to be appreciated that other verification techniques may be employed.

System 100 may also include a verification logic 140 that is configured to selectively process item 130 into a configuration item 150 having a third content and/or format. Whether and/or how item 130 is processed may depend, at least in part, on analyzing the source of item 130 and/or the digital integrity of item 130. Once again, verifying a source may include analyzing a digital signature while verifying integrity may include analyzing a digital signature, a hash, a digitally signed hash, and so on. In some cases, the digital signature may be automatically generated, for example, by an automated signature process or logic.

In one example, item 120 may be provided to security logic 110 by a configuration item provider 160 known to the security logic 110 as evidenced by a relationship established through a first set of keys 170. Similarly, item 130 may be provided to the verification logic 140 by the security logic 110, where the security logic 110 is known to and related to the verification logic 140 by a second set of keys 180. The second set of keys 180 will be different from the first set of keys 170. In one example, sets of keys 170 and 180 may be asymmetric sets of keys like public key, private key pairs.

In one example, the first content may include a digital signature that is related, at least in part, to the first set of keys 170. For example, provider 160 may have been provisioned with a public key from the first set of keys 170 and security logic 110 may have been provisioned with a paired private key from the first set of keys 170. Thus, provider 160 and security logic 110 may employ asymmetric cryptographic and/or digital signature techniques to protect a system using configuration item 120. It is to be appreciated that the provisioning may have been automated rather than having been performed by a human user.

In another example, the first content may include a hash that is digitally signed by provider 160. The hash may be related, at least in part, to the first set of keys 170. For example, a one way hash algorithm may produce a hash from the content in item 120 and the provider 160 may digitally sign the hash. In another example, the first content may include a cyphertext related, at least in part, to the first set of keys 170. For example, rather than and/or in addition to providing a digital signature or a digitally signed hash, provider 160 may encrypt item 120 using a public key provided by security logic 110.

In one example, item 130 may include a second content that includes a digital signature. For example a cleartext set of name/value pairs may have been used as an input, along with an asymmetric key, to produce a digital signature that is added to item 130. The digital signature may have been supplied by provider 160 while in another example the digital signature may have been supplied by security logic 110. While two sources for digital signatures are described, it is to be appreciated that item 130 may even include two digital signatures, one provided by provider 160 and one provided by security logic 110.

To facilitate security logic 110 producing a second digital signature that is not seen by provider 160, which facilitates isolating an ultimate receiver of item 130 from provider 160, security logic 110 may be provisioned with a public key from the second set of keys 180 and verification logic 140 may be provisioned with a related private key from the second set of keys 180. These keys may be distributed with only the knowledge of the security logic 110 and the verification logic 140. Therefore, provider 160 may not even be aware of this second asymmetric key security protocol, making it less likely that a surreptitious provider could infiltrate a system via configuration items.

While digital signatures are described above, it is to be appreciated that item 130 may have other and/or additional content. For example, item 130 may include a first hash that is digitally signed by provider 160 and a second hash that is digitally signed by security logic 110. The first hash may be produced in conjunction with the first set of keys 170 while the second hash may be produced in conjunction with the second set of keys 180. For example, item 130 may include a cleartext set of configuration records that were provided as an input to a message digest algorithm. The digest may then have been provided as an input, along with an asymmetric key, to a digital signature process that produces a digital signature and adds it to item 130.

Configuration item 150 may have various forms. These forms may depend, for example, on the system(s) to which item 150 will be provided and/or on the system(s) that produced item 150. In a retrofit situation where system 100 is being added to protect an existing system, item 150 may be cleartext and may include no additional information like digital signatures, hashes, and so on. In a new built situation, where system 100 may be part of a system that is concerned with configuration file security, item 150 may include additional information like digital signatures, hashes, digitally signed hashes, cyphertext, and so on. This additional information may come, for example, from provider 160, from security logic 110, from verification logic 140, and so on. By way of illustration, as cleartext and/or cyphertext arrives as part of a configuration item, hashes, digital signatures, and so on may be created using the cleartext and/or cyphertext as an input. These hashes, digital signatures, and so on may be added to the configuration item as it works its way through system 100. Once again, while a separate item 150 is illustrated, it is to be appreciated that item 150 and item 130 may be the same item (e.g., file) whose contents and/or format has been processed. It is to be appreciated that item 150 may be provided by a system like a configuration file server and/or logic, rather than by a human user.

Figure 6:
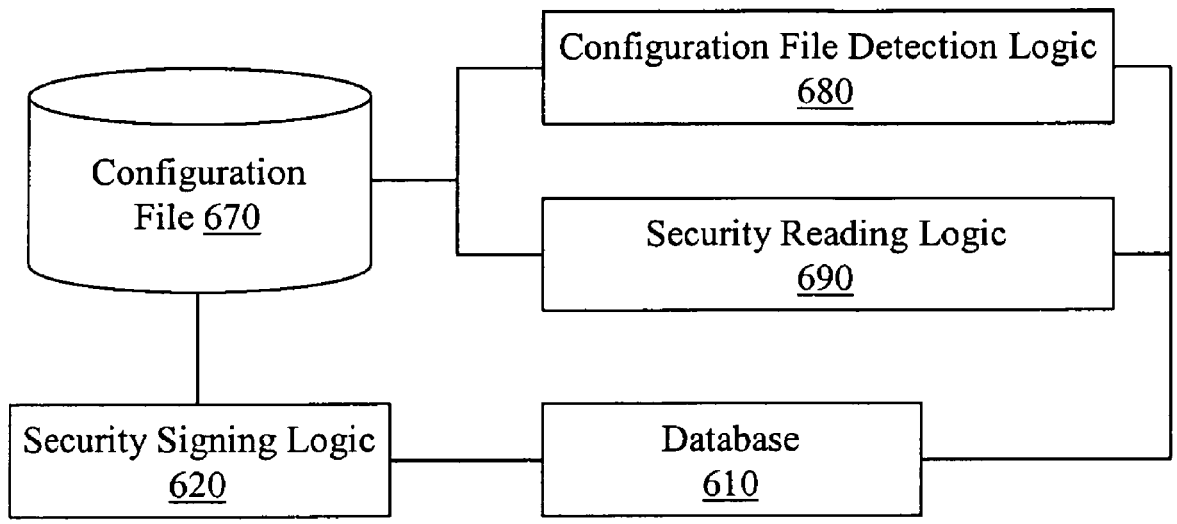
FIG. 6 illustrates an example system for providing just-in-time checking for systems that interact with configuration items.
Figure 1:
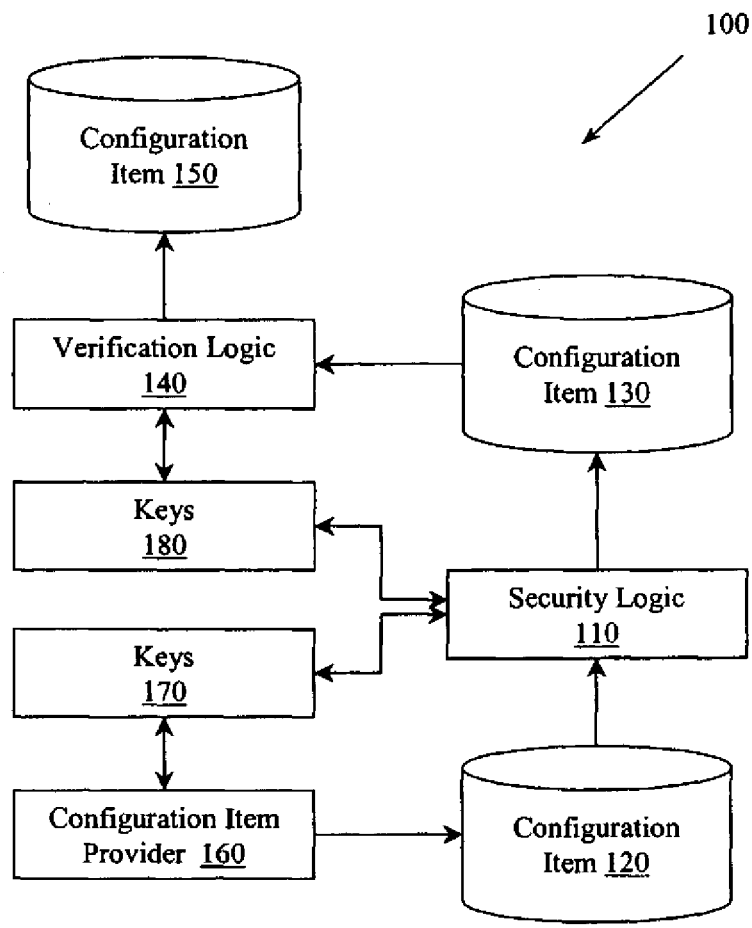
Figure 2:
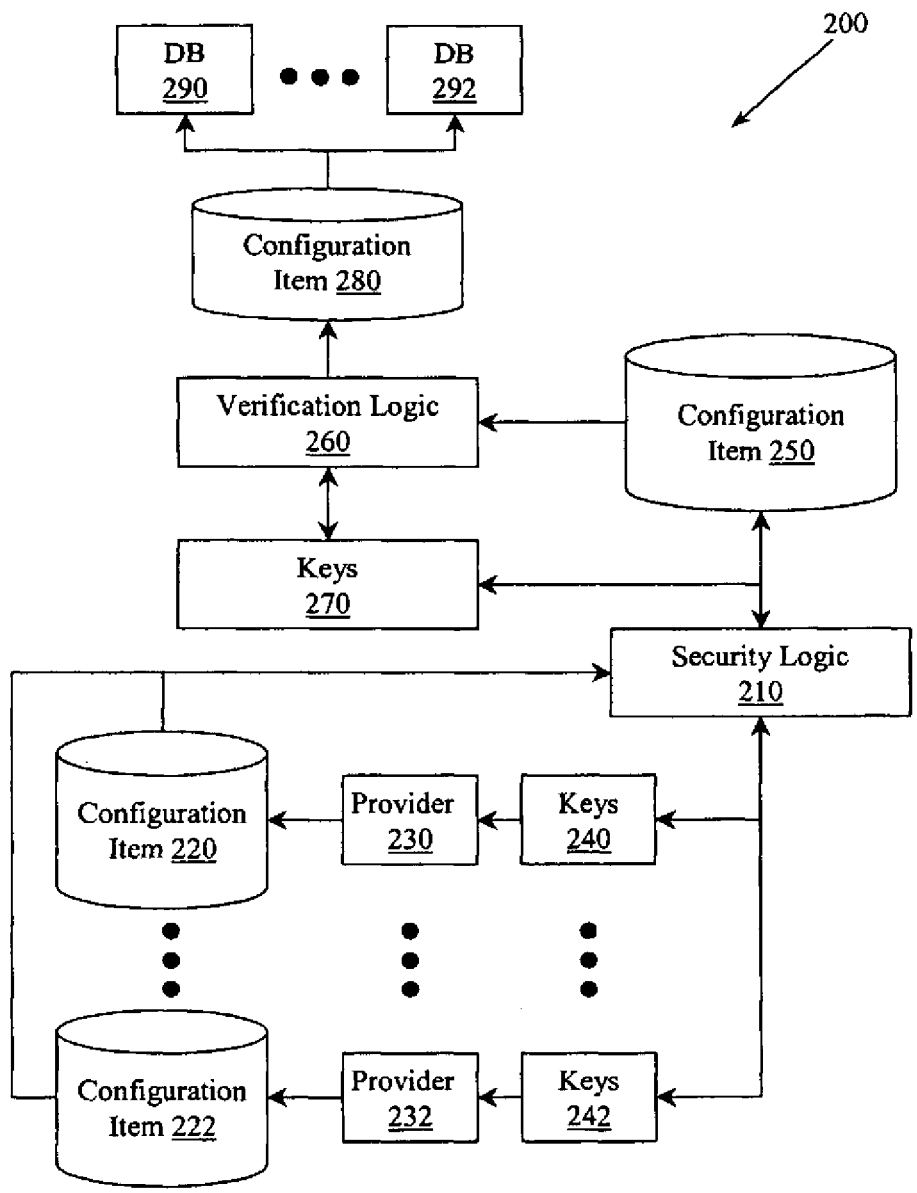
Figure 3:
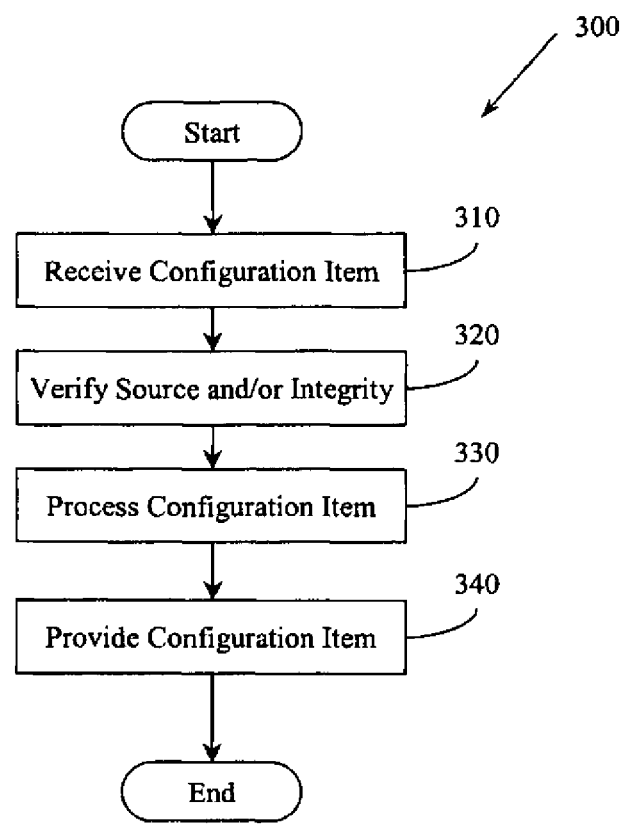
Figure 4:
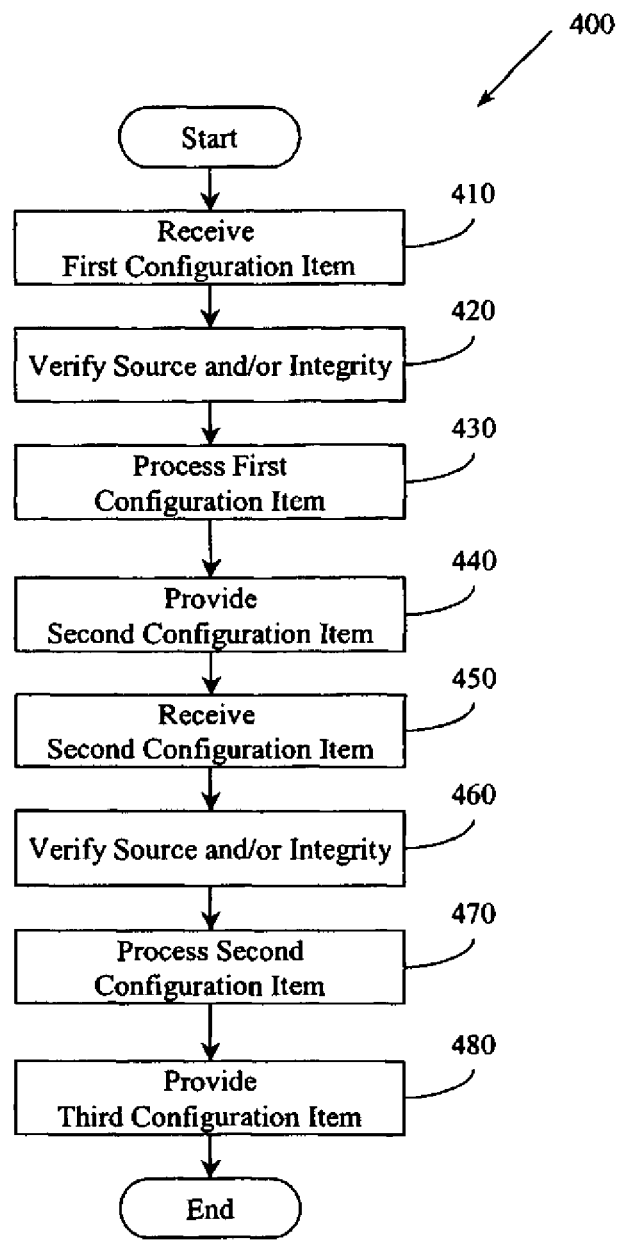
Figure 6:
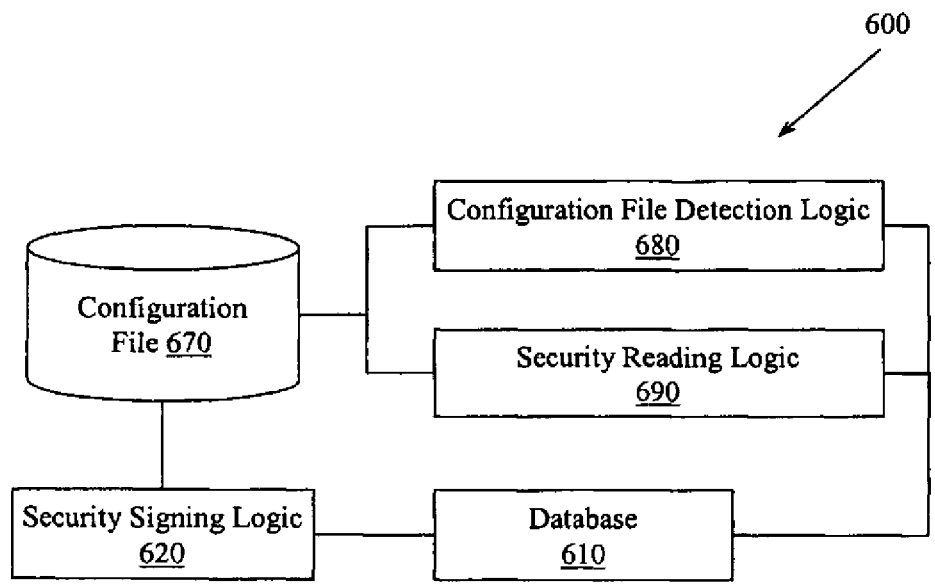

System 100 may also include, (not illustrated in FIG. 1), a configuration file detection logic 680 (FIG. 6) that is configured to determine when a configuration file 670 is about to be accessed. The configuration file detection logic 680 is illustrated in association with system 600 (FIG. 6). Configuration file detection logic 680 facilitates determining that configuration file 670 is about to be used and to initiate security checking on that configuration file. In one example like that illustrated in FIG. 6 configuration file 670 may have been self-generated and self-signed by a database system 610. In another example, like that illustrated in FIG. 1 and FIG. 2, configuration file 670 may have been provided by an outside entity like provider 160. Provider 160 may be, for example, a logic and/or a process.

System 100 may also include a security reading logic 690 (FIG. 6) that is configured to verify that a digital signature(s) and/or other security item(s) associated with configuration file 670 indicate(s) that configuration file 670 maintains digital integrity from the time when the digital signature(s) and/or other security item(s) were added to configuration file 670. This facilitates just-in-time checking of configuration files. When used in conjunction with security logic 110 and verification logic 140, these logics facilitate ensuring that a configuration file is initially secure and that it remains secure until the time(s) when it is accessed. By way of illustration, a configuration file may include data concerning tuning parameters specific to a server. If a hacker changes one of these tuning parameters, then security logic 110 and/or verification logic 140 may detect the change.

Figure 2:
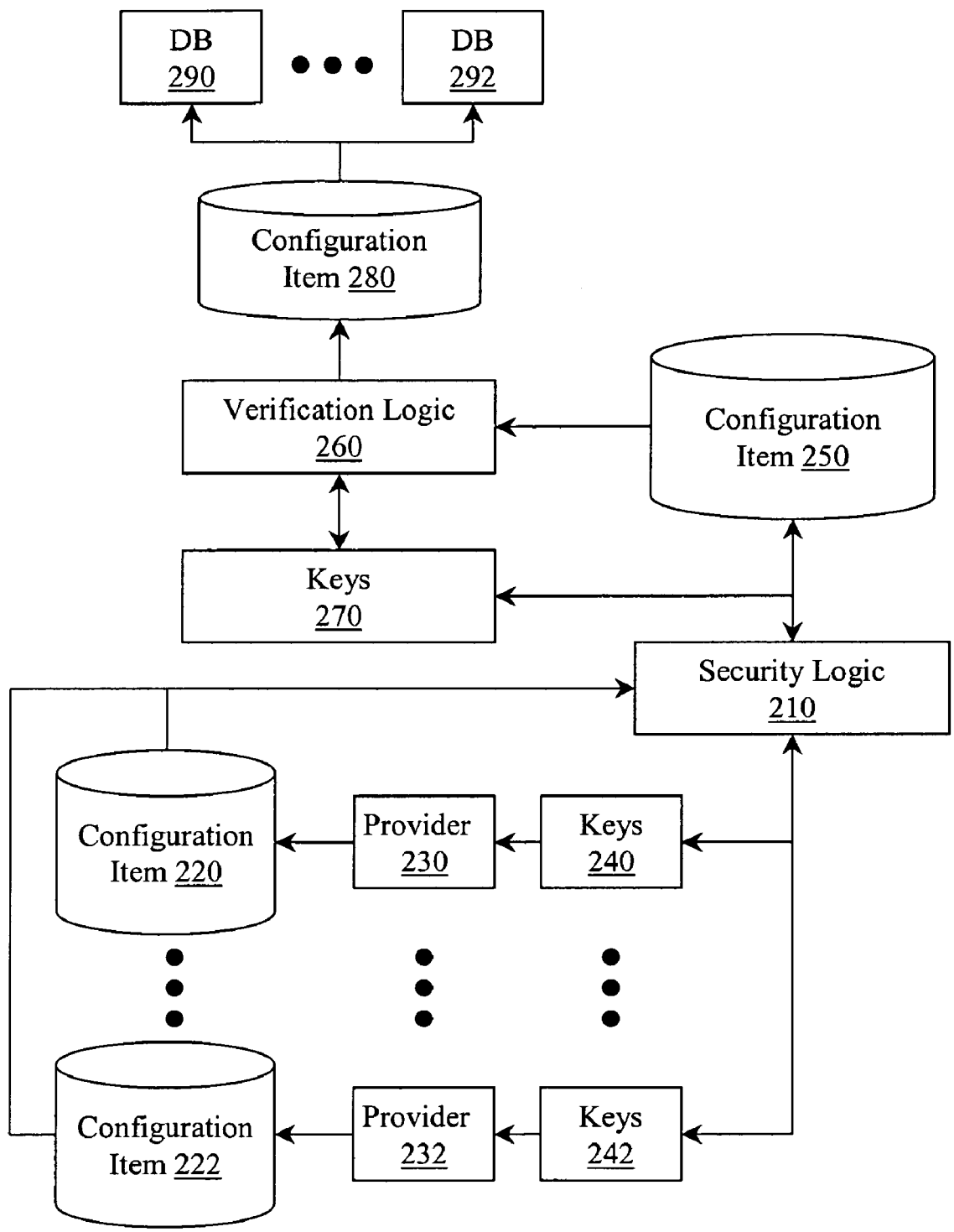
FIG. 2 illustrates another example system for providing multilayer security for systems that interact with configuration items.

FIG. 2 illustrates a system 200 that is configured to provide multilayer security for systems (e.g., database systems 290 through 292) that interact with configuration items (e.g., 220 through 222). Rather than having configuration item providers 230 through 232 interact directly with systems 290 through 292, intermediate logics configured to provide multilayered security are interposed between the providers 230 through 232 and the systems 290 through 292.

System 200 includes elements similar to those in system 100 (FIG. 1). For example, system 200 includes a security logic 210, a verification logic 260, and a second set of keys 270. However, system 200 is illustrated interacting with multiple providers 230 through 232 and thus receiving multiple configuration items 220 through 222 that have first contents and first formats. Since security logic 210 interacts with multiple providers 230 through 232, multiple first sets of keys (e.g., 240 through 242) are provided. Thus, as a threshold first layer of security, only providers to whom public keys have been distributed will be able to communicate effectively with security logic 210. While public keys may be surreptitiously acquired or inappropriately used, and thus while a provider may be spoofed by an unscrupulous individual, this is but a first layer. It is to be appreciated that providers 230 through 232 may include automated configuration item providers. For example, one automated provider may be tasked with monitoring a system and then determining a type of memory allocation that the system should use.

A second layer may be provided by verification logic 260. For example, verification logic 260 may be configured to receive configuration item 250 from one and only one source, (e.g., security logic 210). This source may be known to the verification logic 260 but may not be known by the providers 230 through 232. Thus, the providers may not even be aware that verification logic 260 exists and that it will only receive from security logic 210. Or, verification logic 260 may be advertised as being the receiver of configuration files while only "true providers" will know that security logic 210 exists. Thus, unscrupulous providers may be lured into transmitting to verification logic 260 and thus being detected.

Verification logic 260 may in turn be configured to provide configuration item 280 having the third content to database systems 290 through 292. These database systems may be configured to accept configuration items from only one source (e.g., verification logic 260). Once again, unscrupulous providers may be tempted to transmit directly to the databases 290 through 292, which once again will lead to their detection and their defeat. To facilitate maintaining the exclusive relationship between the security logic 210 and the verification logic 260, security logic 210 may be provisioned with a public key from the second set of keys 270 and verification logic 260 may be provisioned with a related private key from the second set of keys 270. Thus, communications received at verification logic 260 that originated at locations other than security logic 210 may not satisfy verification requirements associated with public/private keys distributed to verification logic 260 and security logic 210.

Like system 100, system 200 may be supplemented with a configuration file detection logic 680 (FIG. 6) and/or a reading security logic 690 (FIG. 6) to facilitate implementing just-in-time checking of configuration files.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks may occur in different orders and/or concurrently with other blocks from that shown and described. Moreover, less than all the illustrated blocks may implement an example methodology. In some examples, blocks may be combined or separated into multiple components. Furthermore, additional and/or alternative methodologies can employ additional, not illustrated blocks.

Elements illustrated in the flow diagrams denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device.

Figure 3:
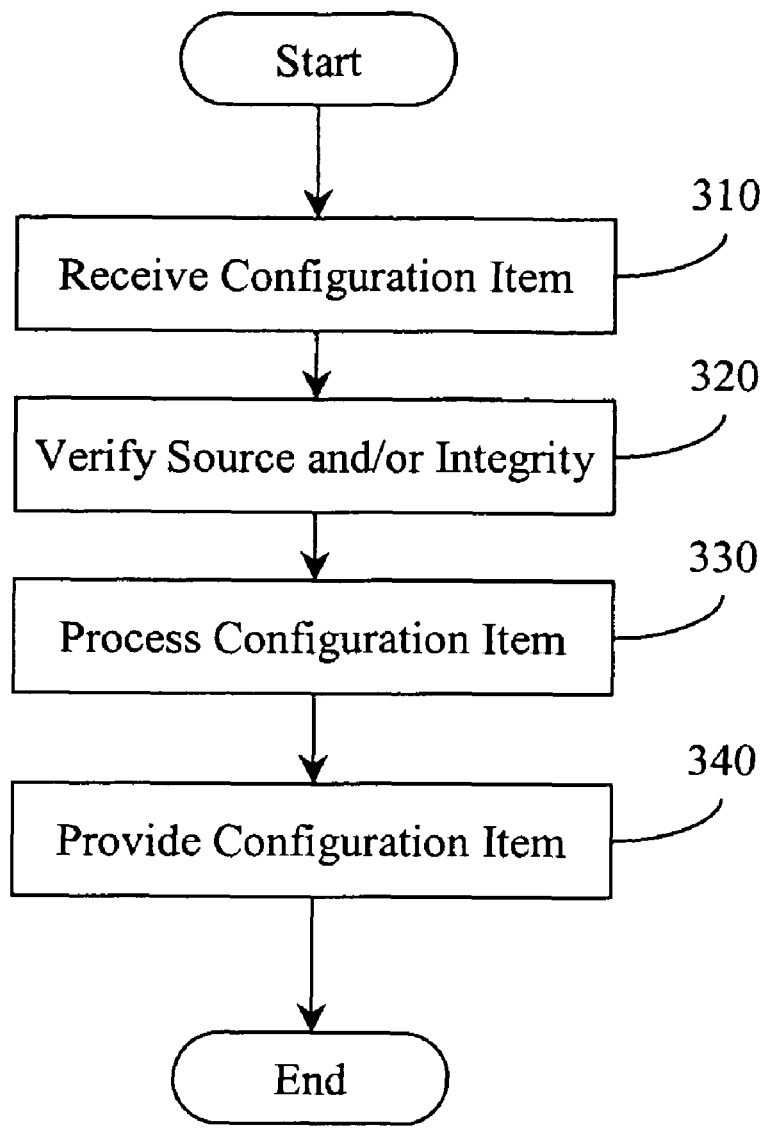
FIG. 3 illustrates an example method for providing multilayer security for systems that interact with configuration items.
Figure 4:
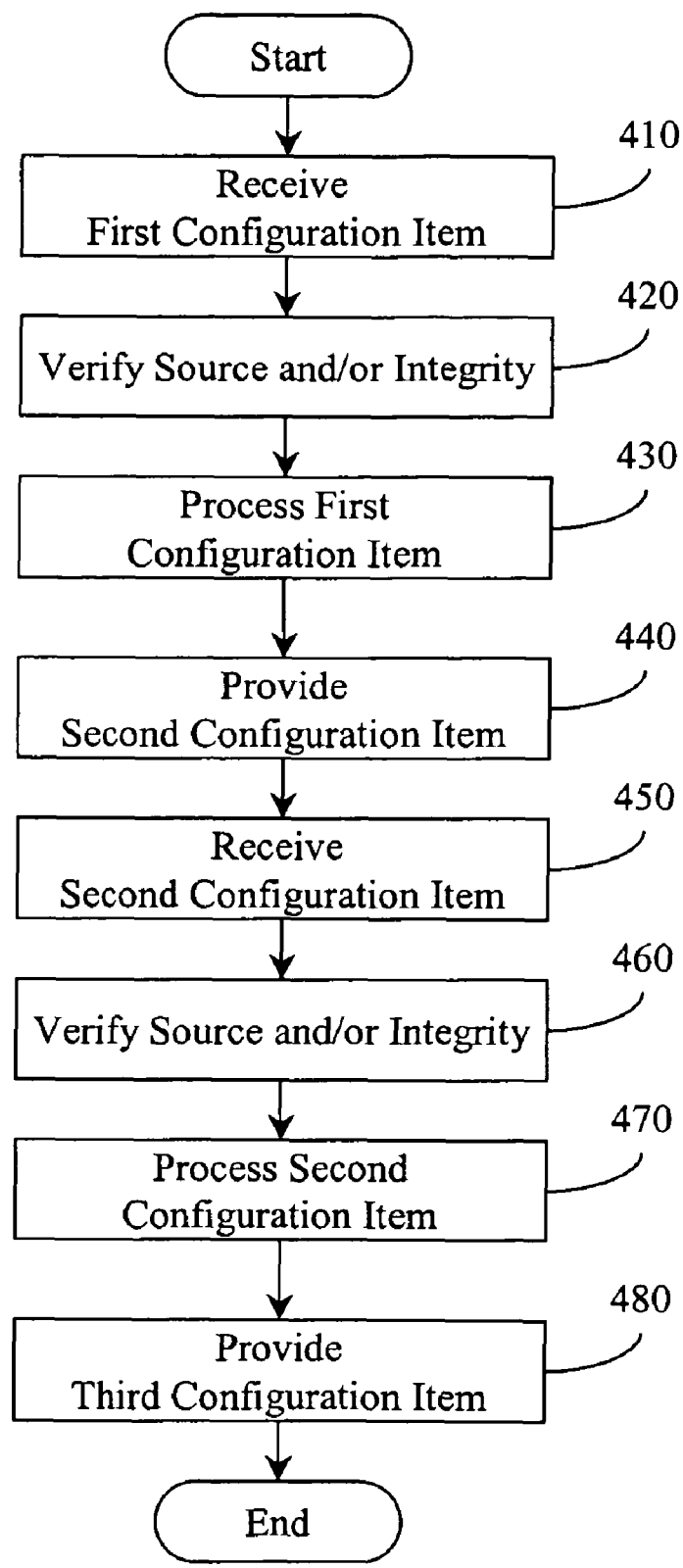
FIG. 4 illustrates an example method for providing multilayer security for systems that interact with configuration items.

The flow diagrams of FIGS. 3 and 4 are not intended to limit the implementation of the described examples. Rather, the diagrams illustrate functional information one skilled in the art could use to design/fabricate circuits, generate software, or use a combination of hardware and software to perform the illustrated processing.

FIG. 3 illustrates a computer-implemented method 300 associated with providing multilayered security for systems that interact with configuration items. Method 300 may include, at 310, receiving a configuration item having a first format and a first content. The first content may include, for example, a cleartext containing values for certain configurable items, a cyphertext containing values for certain configurable items, and so on. The configurable items may include, for example, security level parameters, security type parameters, optimization level parameters, optimization type parameters, memory allocation technique parameters, database tuning parameters, and so on.

Method 300 may also include, at 320, verifying the source and/or the digital integrity of the configuration item received at 310. In one example, verifying the source and/or the integrity of the configuration item received at 310 may include analyzing a digital signature in the configuration item received at 310. The digital signature may be related to an asymmetric key. In another example, verifying the source and/or the digital integrity of the configuration item received at 310 may include analyzing a digitally signed hash in the configuration item received at 310. Like the digital signature, the digitally signed hash may be related to an asymmetric key. In still another example, verifying the source and/or the digital integrity of the configuration item received at 310 may include decrypting a cyphertext in the configuration item received at 310, the cyphertext being produced using an asymmetric key. While three different verification approaches are described, it is to be appreciated that in some examples various combinations of these approaches may be employed. For example the first content may include both a digital signature and a cyphertext.

Method 300 may also include, at 330, selectively processing the configuration item received at 310 into a second configuration item having a second content and a second format. In one example, processing the configuration item received at 310 into a second configuration item may include removing a digital signature from the first content, removing a digitally signed hash from the first content, decrypting a cyphertext, adding a digital signature to the second content, adding a digitally signed hash to the second content, and/or encrypting a cleartext and storing the cyphertext in the second content. By way of illustration, the first content may include a digitally signed hash. However the second content may include a cyphertext and no digitally signed hash. Thus, processing the first content into the second content may include removing the digitally signed hash from the first content and encrypting a cleartext in the first content into a cyphertext in the second content.

Method 300 may also include, at 340, providing the configuration item having the second content and the second format to a database system. In one example, the second content may include a digital signature, a digitally signed hash, a cleartext, a cyphertext, and so on. Since method 300 may execute before a configuration item is provided to a database system, method 300 may be retrofitted into an existing system to provide security from configuration items where previously there was none.

Method 300 provides two layered security to a system interacting with a configuration item. It is to be appreciated that the configuration item may be provided by a computerized process and/or system. First, the configuration item must satisfy source and/or integrity standards that are verified at 320. Then, method 300 may process the configuration item by reformatting it, encrypting it, decrypting it, adding/removing a digital signature, adding/removing a digitally signed hash, and so on. These steps may not be known to a provider. The provider may be isolated from the ultimate destination for the configuration item and may even think that they are submitting their configuration item to the ultimate destination. Thus, providing the processed configuration item in a format known to the database system but not necessarily known to the configuration item provider provides a second layer of security. FIG. 4 describes a method 400 that includes a third and fourth layer of protection.

While FIG. 3 illustrates various actions occurring in serial, it is to be appreciated that various actions illustrated in FIG. 3 could occur substantially in parallel. By way of illustration, a first process could verify source information, a second process could verify digital integrity, and a third process could process the first content into the second content having the second format. While three processes are described, it is to be appreciated that a greater and/or lesser number of processes could be employed and that lightweight processes, regular processes, threads, and other approaches could be employed.

In one example, methodologies may be implemented as processor executable instructions and/or operations stored on a computer-readable medium. Thus, in one example, a computer-readable medium may store processor executable instructions operable to perform a method for providing multilayered security to systems interacting with configuration items. The method may include receiving a configuration item having a first format and a first content then verifying the source and/or the digital integrity of the configuration item. The verifying may include, for example, analyzing a digital signature related to an asymmetric key. The method may also include selectively processing the configuration item having the first content into a configuration item having a second content and a second format. The processing may include, for example, removing a digital signature, removing a digitally signed hash, decrypting a cyphertext, adding a digital signature, adding a digitally signed hash, encrypting a cleartext, and so on. The method may also include providing the configuration item having the second content and the second format to a database system. While the above method is described being stored on a computer-readable medium, it is to be appreciated that other example methods described herein can also be stored on a computer-readable medium.

FIG. 4 illustrates a method 400 associated with providing multilayered security for systems that interact with configuration items. Method 400 takes several actions similar to actions taken in method 300 (FIG. 3). For example, a configuration item is received at 410, source and/or digital integrity are verified at 420, the first content/format is processed into a second content/format at 430, and the processed configuration item is provided at 440. These actions may be performed by a first logic. However, the first logic may communicate with a second logic that takes additional actions that provide additional layers of security. In one example, which may be practiced in a system like that illustrated in FIG. 6, the two logics may both be part of a self-configuring system. Thus, the configuration item received at 410 may be received from the same system to which the configuration item will be provided.

Method 400 may also include, at 450, receiving the configuration item having the second format and the second content. Method 400 may also include, at 460, verifying the source and/or the digital integrity of the configuration item having the second content. This verification may proceed similar to that undertaken at 420. Since this action may be taken by a different logic, a second set of asymmetric keys may be employed to provide an additional level of security. Neither of these keys may ever be exposed to a configuration item provider, providing an additional level of security.

Method 400 may also include, at 470, selectively processing the second content into a third content having a third format. Once again, hiding the ultimate format and the ultimate required contents for a configuration file from a provider may reduce opportunities to "hack" a system through its configuration files. If it is not known what the database is looking for format-wise (e.g., encrypted) and content-wise (e.g., digitally signed hash) it is much more difficult to provide files designed with malice aforethought.

Method 400 may also include, at 480, providing the configuration item having the third content and the third format to the database system. If the database system is configured to only receive configuration items from method 400 this facilitates providing yet another layer of security.

Figure 5:
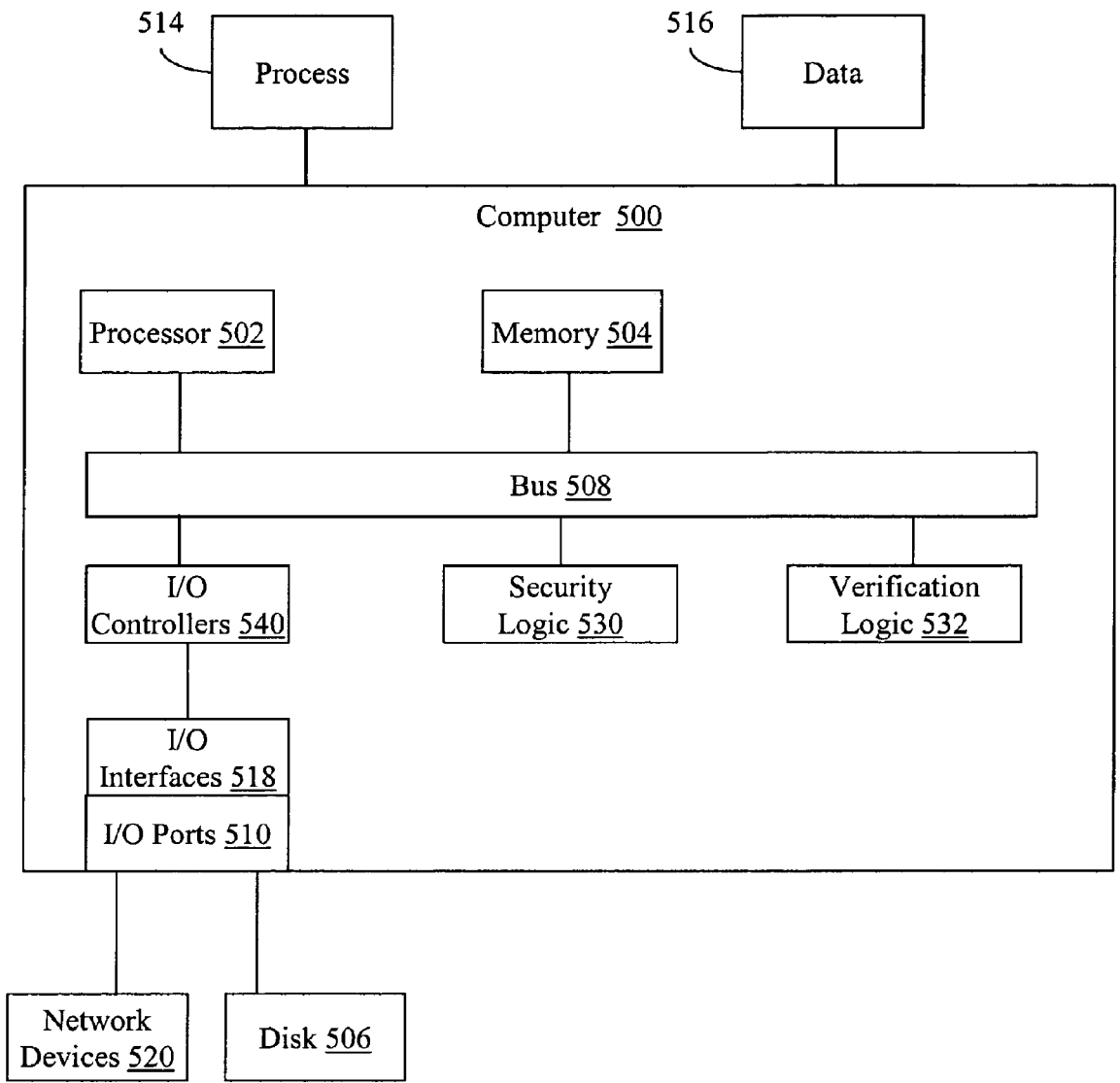
FIG. 5 illustrates an example computing environment in which example systems and methods illustrated herein can operate.

FIG. 5 illustrates an example computing device in which example systems and methods described herein, and equivalents, can operate. The example computing device may be a computer 500 that includes a processor 502, a memory 504, and input/output controllers 540 operably connected by a bus 508. In one example, the computer 500 may include a security logic 530 and a verification logic 532 that are configured to facilitate providing multilayered security for configuration items. Thus security logic 530 and verification logic 532 may provide means (e.g., hardware, software in execution on a processor, firmware) for ascertaining the identity of a provider of a configuration item, means (e.g., hardware, software in execution on a processor, firmware) for evaluating the identity of the provider, and means (e.g., hardware, software in execution on a processor, firmware) for evaluating the digital integrity of the configuration item. In one example, logics 530 and 532 may also provide means (e.g., hardware, software in execution on a processor, firmware) for selectively digitally signing the configuration item to vouch for the identity of the provider and the digital integrity of the configuration item. In another example, logics 530 and 532 may provide means for performing just-in-time checking of a configuration file that is about to be accessed.

While logics 530 and 532 are illustrated as hardware components attached to bus 508, it is to be appreciated that in one example, logics 530 and 532 could be implemented in software, stored on disk 506, brought into memory 504, and executed by processor 502. Computer 500 may be configured to run, for example, a database system.

Generally describing an example configuration of computer 500, processor 502 can be a variety of various processors including dual microprocessor and other multi-processor architectures. Memory 504 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to computer 500 via, for example, an input/output interface (e.g., card, device) 518 and an input/output port 510. Disk 506 may be, for example, devices like a magnetic disk drive, a solid state disk drive, a floppy disk drive, a tape drive, a Zip drive, a flash memory card, and/or a memory stick. Furthermore, disk 506 may be devices like optical drives (e.g., a CD-ROM), a CD recordable drive (CD-R drive), a CD rewriteable drive (CD-RW drive), and/or a digital video ROM drive (DVD ROM). Memory 504 can store processes 514 and/or data 516, for example. Disk 506 and/or memory 504 can store an operating system that controls and allocates resources of computer 500. Processes 514, an operating system, and various hardware, software, and/or firmware components associated with computer 500 may employ configuration information. This information may be handled by logics 530 and 532 to provide multilevel security for computer 500 with respect to the configuration information.

Computer 500 may interact with input/output devices via i/o interfaces 518 and input/output ports 510. Input/output devices can include, but are not limited to, a keyboard, a microphone, a pointing and selection device, cameras, video cards, displays, disk 506, network devices 520, and the like. Input/output ports 510 may include but are not limited to, serial ports, parallel ports, and USB ports.

Computer 500 may operate in a network environment and thus may be connected to network devices 520 via i/o devices 518, and/or i/o ports 510. Through network devices 520, computer 500 may interact with a network. Through the network, computer 500 may be logically connected to remote computers. Various remote computers may be configured to provide configuration files, configuration objects, and so on to computer 500. These files may be processed by logics 530 and 532 before being presented to a database system being run by computer 500.

FIG. 6 illustrates a system 600 configured to provide just-in-time checking for systems that interact with configuration items. System 600 includes a database system 610 that is configured to interact with configuration items. In one example, database 610 may self-generate configuration files. Thus the configuration file may be provided by a computer rather than a human. Thus system 600 may include a security signing logic 620 that is configured to add a digital signature to a configuration file 670. While a digital signature is described, it is to be appreciated that other security items like a hash, a cyphertext, and so on, may be added to configuration file 670. Also, while a configuration file 670 is described, it is to be appreciated that other configuration items including a configuration object, a configuration record, and so on, may be manipulated.

System 600 may include a configuration file detection logic 680 that is configured to determine when configuration file 670 is about to be accessed. Before allowing configuration file 670 to be accessed, a security reading logic 690 may verify that a digital signature in configuration file 670 indicates that configuration file 670 maintains digital integrity from the time it was signed by security signing logic 620. The digital signature may be produced, for example, using an asymmetric key. In one example, security signing logic 620 may be configured to encrypt the configuration file 670.

When system 600 is employed with a system like system 100 (FIG. 1), then configuration file 670 may be an example of a configuration item 150 that has passed through processing provided by security logic 110 and verification logic 140. Logics 110 and 140 may facilitate establishing that a configuration item like configuration file 670 is initially secure. Logics 680 and 690 facilitate providing just-in-time checking that an initially secure configuration file retains its security until the time it is used.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

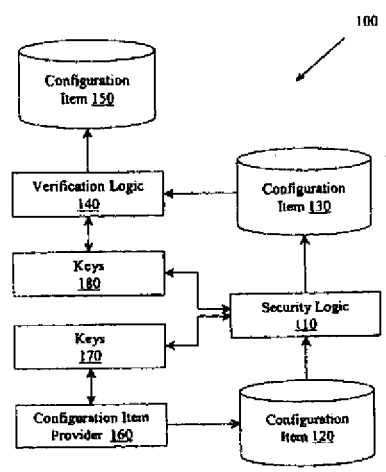

What is claimed is:

1. A system, comprising:
 a processor;
 a memory; and
 an interface to connect a group of logics, the group of logics comprising:
  a security logic configured to selectively process a configuration item having a first content into a configuration item having a second content based, at least in part, on analyzing the source of the configuration item having the first content and on analyzing digital integrity of the configuration item having the first content, the configuration item having the first content being provided to the security logic by a configuration item provider known to the security logic and related to the security logic by a first set of keys; and
  a verification logic configured to selectively process the configuration item having the second content into a configuration item having a third content and to selectively provide the configuration item having the third content based, at least in part, on analyzing the source of the configuration item having the second content and on analyzing the digital integrity of the configuration item having the second content, the configuration item having the second content being provided to the verification logic by the security logic, the security logic being related to the verification logic by a second set of keys different from the first set of keys.

2. The system of claim 1, including:
 a configuration file detection logic configured to determine when a configuration file is about to be accessed; and
 a security reading logic configured to verify that one or more digital signatures associated with the configuration file indicate that the configuration file maintains digital integrity from the time when the one or more digital signatures were added to the configuration file.

3. The system of claim 1, the first content including a digital signature related, at least in part, to the first set of keys, the configuration item provider being provisioned with a public key from the first set of keys, the security logic being provisioned with a related private key from the first set of keys.

4. The system of claim 1, the first content including one or more of, a hash digitally signed by the configuration item provider, the hash being related at least in part to the first set of keys, and a cyphertext related at least in part to the first set of keys.

5. The system of claim 1, the second content including a digital signature, the security logic being provisioned with a public key from the second set of keys, the verification logic being provisioned with a related private key from the second set of keys.

6. The system of claim 5, the second content including a first digital signature provided by the configuration item provider and a second digital signature provided by the security logic, the first digital signature being related to the first set of keys, the second digital signature being related to the second set of keys.

7. The system of claim 5, the second content including one or more of, a first hash digitally signed by the configuration file provider and a second hash digitally signed by the security logic, the first hash being related to the first set of keys, the second hash being related to the second set of keys.

8. The system of claim 1, the third content including only cleartext.

9. The system of claim 8, the third content including a digital signature.

10. The system of claim 1, the first content including one or more of, a security level parameter, a security type parameter, an optimization level parameter, an optimization type parameter, a memory allocation technique parameter, and a database tuning parameter.

11. The system of claim 1, the first set of keys being asymmetric keys.

12. The system of claim 1, the second set of keys being asymmetric keys.

13. The system of claim 1, the verification logic being configured to provide the configuration item having the third content to a database system.

14. The system of claim 1, the verification logic being configured to receive the configuration item having the second content from one and only one security logic known to the verification logic and to provide the configuration item having the third content to one or more database systems configured to receive the configuration item having the third content from one and only one verification logic, the security logic being provisioned with a public key from the second set of keys and the verification logic being provisioned with a related private key from the second set of keys.

15. The system of claim 14, the security logic being configured to receive the configuration item having the first content from one or more configuration item providers and to provide the configuration item having the second content to one and only one verification logic, the security logic being provisioned with a private key from the first set of keys and the one or more configuration item providers being provisioned with a related public key from the first set of keys.

16. The system of claim 1, where the system is configured to self-generate the configuration item.

17. A system, comprising:
a processor;
a memory; and
an interface to connect a group of logics, the group of logics comprising:
  a security logic configured to selectively process a configuration item having a first content into a configuration item having a second content based, at least in part, on analyzing the source of the configuration item having the first content and on analyzing the digital integrity of the configuration item having the first content, the configuration item comprising one of, a file, an object, and a record, the first content including one or more of, a digital signature related, at least in part, to a first set of keys, a hash digitally signed by a configuration item provider, the hash being related at least in part to the first set of keys, and a cyphertext related at least in part to the first set of keys, the second content including one or more of, a first digital signature provided by the configuration item provider, a second digital signature provided by the security logic, the first digital signature being related to the first set of keys, the second digital signature being related to a second set of keys, a first hash digitally signed by the configuration file provider, and a second hash digitally signed by the security logic, the first hash being related to the first set of keys, the second hash being related to the second set of keys; and
  a verification logic configured to selectively process the configuration item having the second content into a configuration item having a third content and to selectively provide the configuration item having the third content based, at least in part, on analyzing the source of the configuration item having the second content and on analyzing the digital integrity of the configuration item having the second content, the security logic being provisioned with a public key from the second set of keys, the verification logic being provisioned with a related private key from the second set of keys;
  the configuration item having the first content being provided to the security logic by a configuration item provider known to the security logic and related to the security logic by the first set of keys;
  the configuration item having the second content being provided to the verification logic by the security logic, the security logic being related to the verification logic by the second set of keys, the first set of keys being asymmetric keys different from the second set of keys, the second set of keys being asymmetric keys;
  the verification logic being configured to receive the configuration item having the second content from one and only one security logic known to the verification logic and to provide the configuration item having the third content to one or more database systems, the one or more database systems being configured to receive the configuration item having the third content from one and only one verification logic,
  the security logic being configured to receive configuration items having first contents from one or more configuration items providers and to provide configuration items having second contents to one and only one verification logic.

18. The system of claim 17, where the system si configured to self-generate the configuration item.

19. A computer-implemented method, comprising:
receiving a first configuration item having a first format and a first content;
verifying one or more of, a source of the first configuration item, and a digital integrity of the first configuration item;
selectively processing the first configuration item into a second configuration item having a second content and a second format;
receiving the second configuration item;
verifying one or more of, a source of the second configuration item, and a digital integrity of the second configuration item;
selectively processing the second configuration item into a third configuration item having a third content and a third format; and
providing the third configuration item to the database system.

20. The method of claim 19, the first content including one or more of, a digital signature, and a digitally signed hash.

21. The method of claim 20, where processing the first configuration item into the second configuration item includes one or more of, removing a digital signature, removing a digitally signed hash, decrypting a cyphertext, adding a digital signature, adding a digitally signed hash, and encrypting a cleartext.

22. The method of claim 21, the second content including one or more of, a digital signature, and a digitally signed hash.

23. The method of claim 22, where verifying one or more of, the source of the first configuration item, and the digital integrity of the first configuration item comprises analyzing a digital signature in the first configuration item, the digital signature being related to an asymmetric key.

24. The method of claim 22, where verifying one or more of, the source of the first configuration item, and the digital integrity of the first configuration item comprises analyzing a digitally signed hash in the first configuration item, the digitally signed hash being related to an asymmetric key.

25. The method of claim 22, where verifying one or more of, the source of the first configuration item, and the digital integrity of the first configuration item comprises decrypting a cyphertext in the first configuration item, the cyphertext being produced using an asymmetric key.

26. The method of claim 19, the first content including one or more of, a security level parameter, a security type parameter, an optimization level parameter, an optimization type parameter, a memory allocation technique parameter, and a database tuning parameter.

27. The method of claim 19, where the first configuration item is self-generated.

28. A non-transitory computer-readable medium storing processor executable instructions operable to perform a method, the method comprising:
- receiving a first configuration item having a first format and a first content;
- verifying one or more of, a source of the first configuration item, and a digital integrity of the first configuration item by analyzing a digital signature in the first configuration item, the digital signature being related to an asymmetric key;
- selectively processing the first configuration item into a second configuration item have a second content and a second format by performing one or more of, removing a digital signature, removing a digitally signed hash, decrypting a cyphertext, adding a digital signature, adding a digitally signed hash, and encrypting a cleartext; and
- receiving the second configuration item;
- verifying one or more of, a source of the second configuration item, and a digital integrity of the second configuration item;
- selectively processing the second configuration item into a third configuration item having a third content and a third format; and
- providing the third configuration item to the database system.

29. The non-transitory computer-readable medium of claim 28, where the first configuration item is self-generated.

* * * * *

UNITED STATES PATENT AND TRADEMARK OFFICE
CERTIFICATE OF CORRECTION

| | | |
|---|---|---|
| PATENT NO. | : 7,958,346 B2 | |
| APPLICATION NO. | : 11/206701 | |
| DATED | : June 7, 2011 | |
| INVENTOR(S) | : Wong | |

It is certified that error appears in the above-identified patent and that said Letters Patent is hereby corrected as shown below:

Delete the title page showing an illustrative figure and substitute the attached title page therefor.

Delete figures 1, 2, 3, 4, and 6 and substitute the attached figures therefor.

In column 16, line 15, in Claim 18, delete "si" and insert -- is --, therefor.

Signed and Sealed this
Seventh Day of February, 2012

David J. Kappos
*Director of the United States Patent and Trademark Office*

(12) United States Patent
Wong

(10) Patent No.: US 7,958,346 B2
(45) Date of Patent: Jun. 7, 2011

(54) MULTILAYERED SECURITY FOR SYSTEMS INTERACTING WITH CONFIGURATION ITEMS

(75) Inventor: Daniel ManHung Wong, Sacramento, CA (US)

(73) Assignee: Oracle International Corp., Redwood Shores, CA (US)

( * ) Notice: Subject to any disclaimer, the term of this patent is extended or adjusted under 35 U.S.C. 154(b) by 1676 days.

(21) Appl. No.: 11/206,701

(22) Filed: Aug. 18, 2005

(65) Prior Publication Data
US 2007/0043942 A1 Feb. 22, 2007

(51) Int. Cl.
*H04L 29/06* (2006.01)
(52) U.S. Cl. ......... 713/151; 713/187; 714/14; 714/42; 714/763; 714/807; 711/114
(58) Field of Classification Search ............ 713/187, 713/191, 1, 2, 100, 155 159, 166, 150, 201, 713/176, 180, 182, 194, 151; 707/1, 203; 717/168–178; 726/22–25, 3–4; 380/277–286, 380/259–266, 255, 251, 287; 709/223, 220, 709/217, 203
See application file for complete search history.

(56) References Cited

U.S. PATENT DOCUMENTS

| | | | |
|---|---|---|---|
| 6,292,569 B1 * | 9/2001 | Shear et al. | 380/255 |
| 6,643,694 B1 * | 11/2003 | Chernin | 709/223 |
| 6,694,434 B1 | 2/2004 | McGee et al. | |
| 6,715,075 B1 | 3/2004 | Loukianov | |
| 6,782,474 B1 * | 8/2004 | Ylonen | 713/162 |
| 7,069,437 B2 * | 6/2006 | Williams | 713/166 |
| 2003/0115461 A1 | 6/2003 | O'Neill | |
| 2003/0167407 A1 | 9/2003 | Howard | |

* cited by examiner

*Primary Examiner* — Taghi T Arani
*Assistant Examiner* — Narciso Victoria
(74) *Attorney, Agent, or Firm* — Kraguljac & Kalnay, LLC

(57) ABSTRACT

Systems, methodologies, and other embodiments associated with providing multi-layered security for configuration items are described. One exemplary system may include a security logic configured to process the contents of a configuration item based on the source of the configuration item and the integrity of the configuration item. The exemplary system may also include a verification logic configured to further process the contents and to selectively provide the contents. A configuration item may be provided to the security logic by a configuration item provider known to the security logic and related to the security logic by a first set of keys. The security logic may be related to the verification logic by a second set of keys different from the first set of keys.

29 Claims, 6 Drawing Sheets